May 31, 1938.　　　J. M. DAILY　　　2,118,969
ELECTRIC OZONE GENERATOR
Filed May 12, 1934　　　3 Sheets-Sheet 3
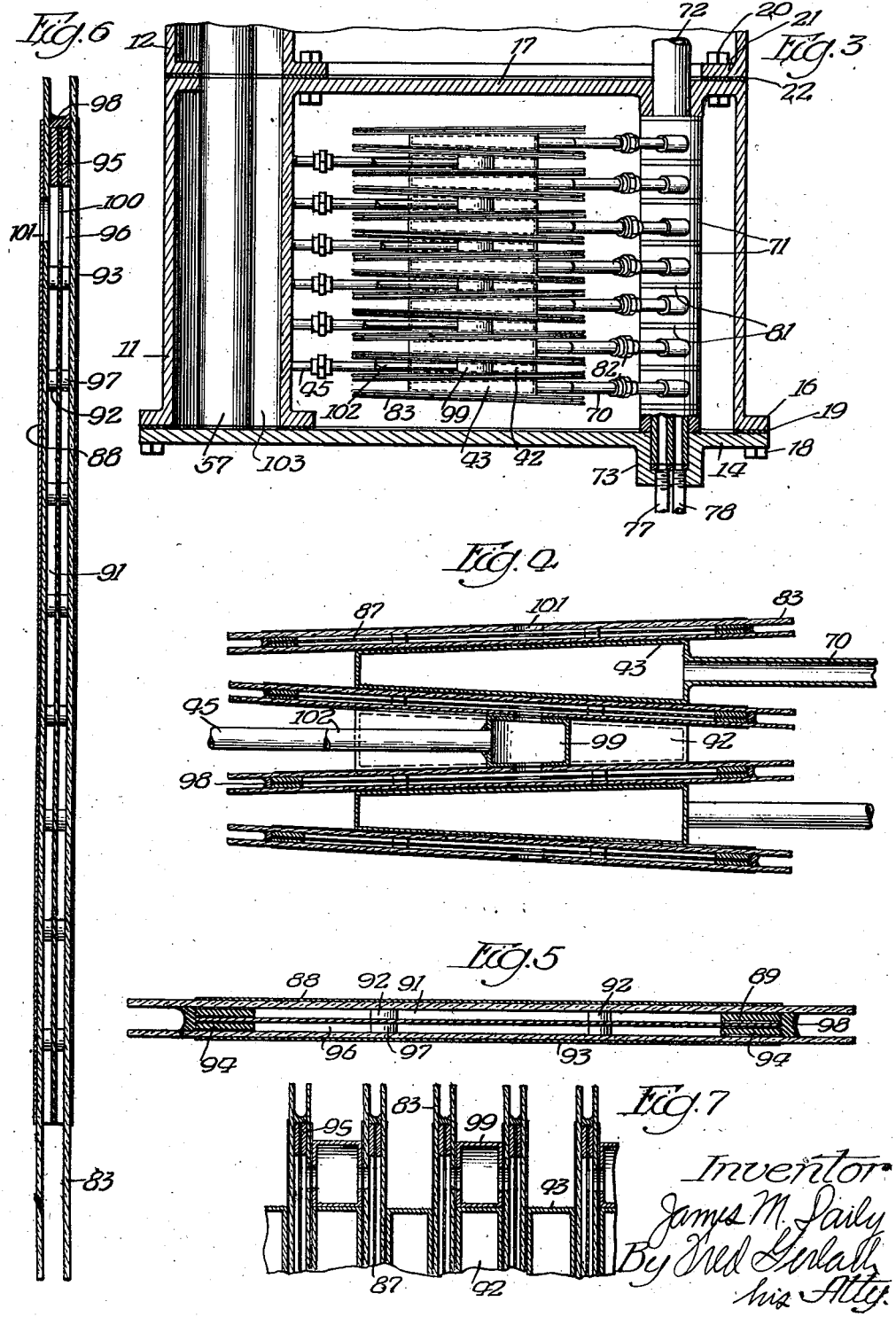

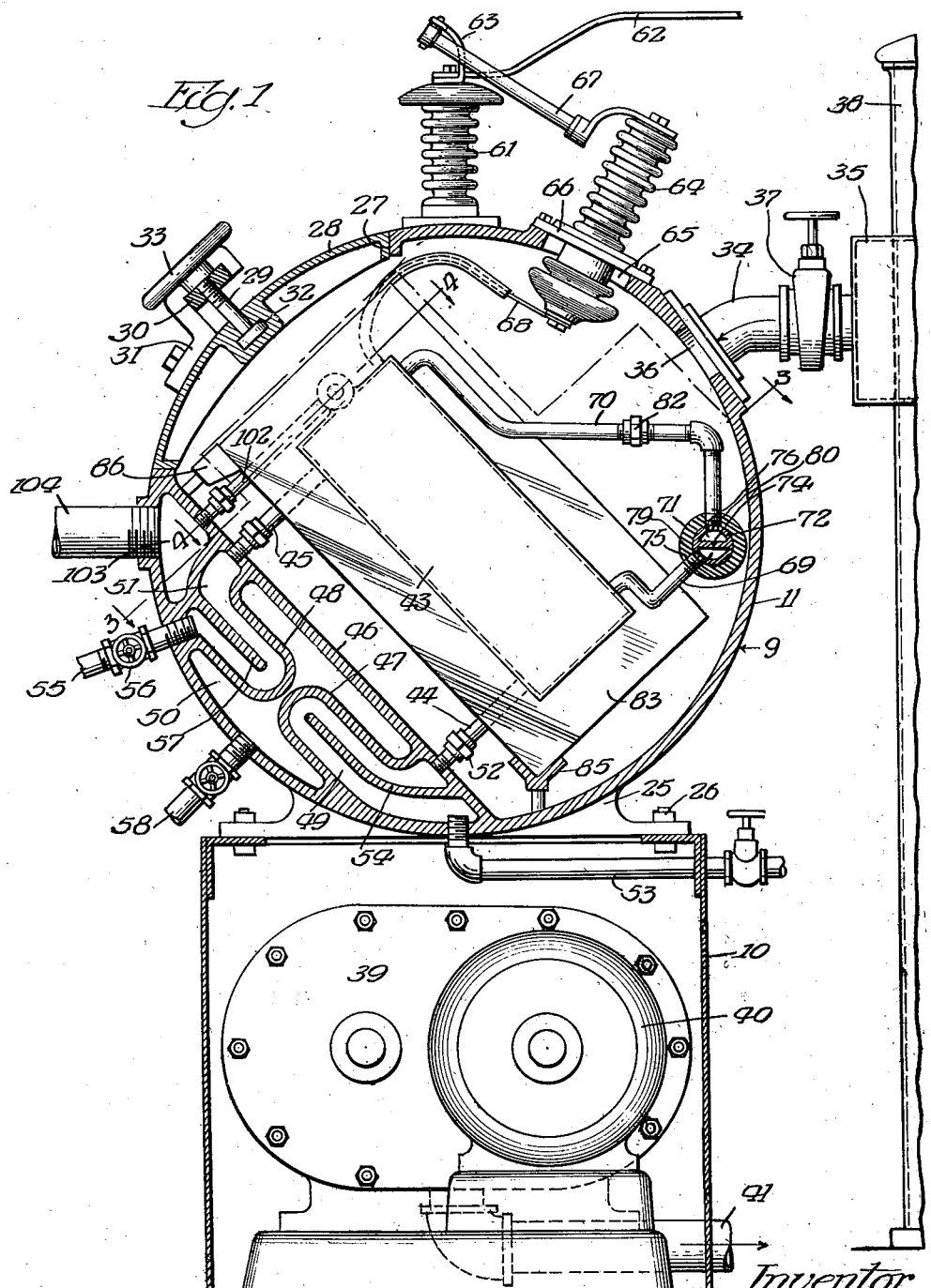

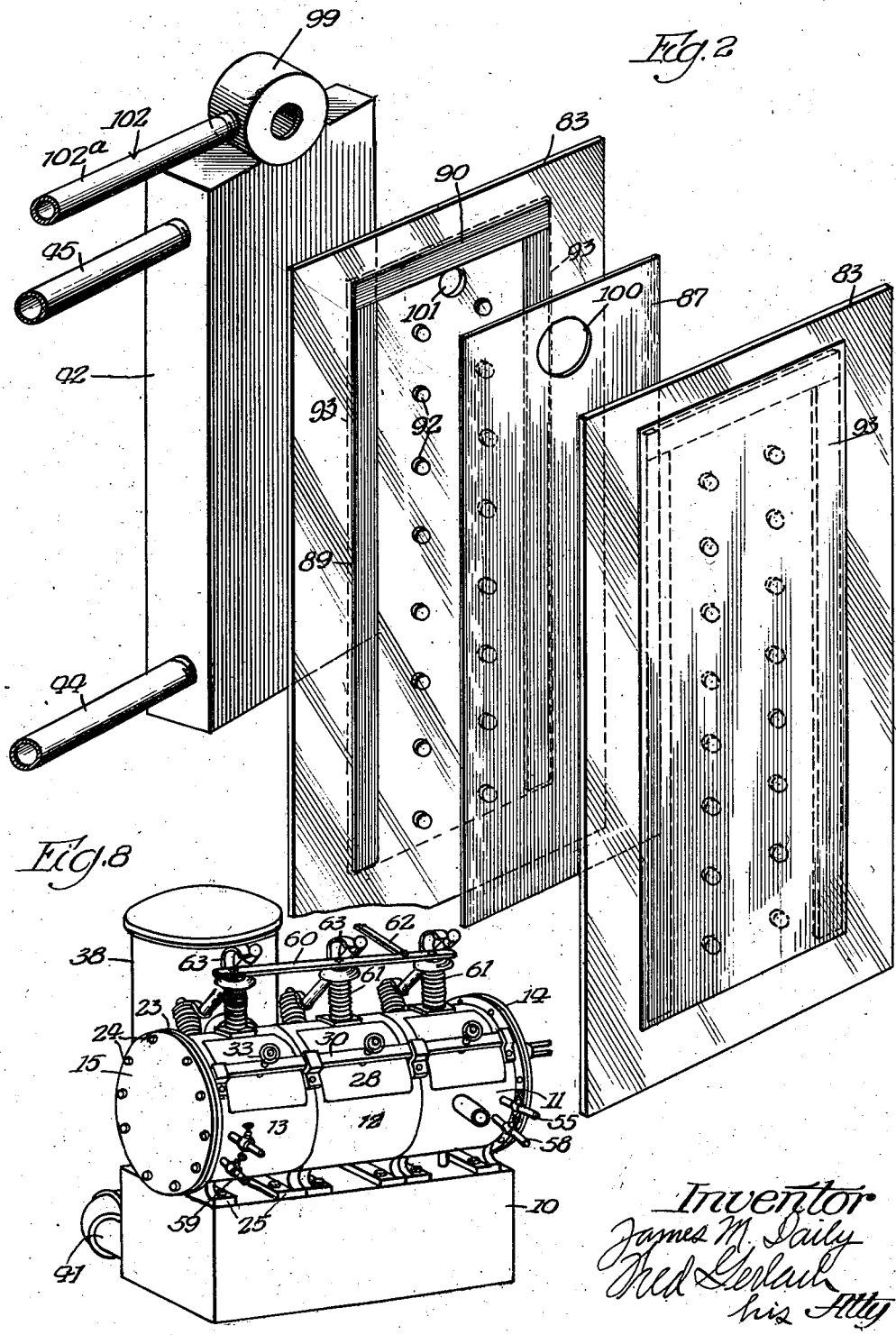

Patented May 31, 1938

2,118,969

UNITED STATES PATENT OFFICE 2,118,969

ELECTRIC OZONE GENERATOR

James Marlowe Daily, Chicago, Ill., assignor to American Ozone Company, Chicago, Ill., a corporation of Illinois Application May 12, 1934, Serial No. 725,278

8 Claims. (Cl. 204—32)

The present invention relates generally to ozone generators. More particularly the invention relates to that type of ozone generator which operates to produce or generate ozone or ozonous air by way of an electrical discharge and comprises a plurality of serially arranged generating units each of which consists of a high tension electrode, a grounded electrode opposite the high tension electrode and a pair of dielectric plates which are disposed between the two electrodes and are spaced apart to form therebetween a combined air passage and spark gap for the formation of ozone by a discharge from the high tension electrode to the grounded one.

One object of the invention is to provide an ozone generator of this type which has more capacity and is more efficient in operation than previously designed generators of the same general character by reason of the fact that the dielectric plates of each ozone generating unit have associated therewith a plate of aluminum or like metal which extends across the combined air passage and spark gap and operates as a "floating" electrode whereby ozone generation or formation within the combined air passage and spark gap is materially increased.

Another object of the invention is to provide an ozone generator of the last mentioned character which includes novel means for collecting the ozone after it is generated or formed between the dielectric plates.

Another object of the invention is to provide an ozone generator of the type and character under consideration in which the high tension electrodes of the ozone generating units are wedge-shaped in cross-section and the grounded electrodes are the same in cross-section and are arranged in alternate and dovetailed relation with the high tension electrodes so that the ozone generating units are rectilinearly positioned.

Still another object of the invention is to provide an ozone generator of the last mentioned character in which the dielectric plates are clamped in place between the high tension and grounded electrodes as a result of the wedge formation of the electrodes, and one group of electrodes is movably supported so that the electrodes thereof may be moved away from the electrodes of the other group in order to release the dielectric plates for replacement or cleaning purposes.

A further object of the invention is to provide an ozone generator of the electric type in which the ozone generating units are divided into sets and the high tension electrodes of each set are supplied with high voltage current through a conductor having a fuse therein whereby the set in which the electrodes are included is controlled independently of the other sets.

A still further object of the invention is to provide an ozone generator of the character under consideration in which the generating units are disposed in a sectional, cylindrical casing which embodies novel means for cooling both groups of electrodes and may be built up in order to increase the capacity of the generator as desired by way of adding to it additional casing sections having ozone generating units therein.

Additionally it is contemplated as one of the objects of the invention, to provide an ozone generator which is generally of new and improved construction and may be manufactured at low and reasonable cost.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a vertical, transverse section of an ozone generator embodying the invention;

Figure 2 is a perspective of the high tension electrode and the dielectric plates of one of the ozone generating units, the various parts of the unit being shown in separated relation for illustrative purposes;

Figure 3 is a horizontal section taken on the line 3—3 of Figure 1 and disclosing in detail the arrangement and dovetailed relation of the high tension and grounded electrodes;

Figure 4 is an enlarged section taken on the line 4—4 of Figure 1;

Figure 5 is a transverse section of the dielectric plates and "floating" electrode of one of the generating units showing the manner in which the electrode is mounted in centered relation with respect to the plates;

Figure 6 is a vertical section of the dielectric plates shown in Figure 5;

Figure 7 is a detail section illustrating the construction and arrangement of the means for collecting the ozone after it is formed between the dielectric plates; and Figure 8 is a perspective of the generator.

The generator which forms the subject matter of the present invention is designed to form ozone or ozonous air from air by way of the discharge of electrical current through space. It is adapted primarily for use in connection with apparatus for purifying water and comprises as one of the main parts thereof a cylindrical horizontally extending casing 9. This casing is mounted on a rectangular housing 10 and consists of three serially arranged ring-shaped sections 11, 12 and 13 and a pair of circular end plates 14 and 15. The casing section 12 is disposed intermediate of the sections 11 and 13 and is the same in diameter as the latter. The casing section 11 is provided at the outer end thereof with an outwardly extending radial flange 16 and has an integral cross wall 17 at its inner end. The end plate 14 serves as a closure for the outer end of the casing section 11 and is removably secured in place by means of an annular series of bolts 18 which extend through the marginal portion of the plate 14 and into the flange 16. A gasket 19 is interposed between the adjacent faces of the flange 16 and the end plate 14 and serves to render the casing section 11 air-tight. The inner end of the casing section 11 is connected to the contiguous end of the casing section 12 by means of a series of bolts 20 which extend through the cross-wall 17 and are carried by an integral inwardly extending flange 21 on the casing section 12. A gasket 22 is interposed between the contiguous faces of the flange 21 and the cross-wall 17 so as to seal one end of the casing section 12. The casing section 13 is connected at its inner end to the other end of the casing section 12 and is provided at its outer end with an integral outwardly extending flange 23. The circular end plate 15 fits against a gasket (not shown) around the flange 23 and is secured to this flange by means of an annular series of bolts 24. Whereas the casing 9 has been described as comprising but three serially arranged and connected ring-shaped sections, it is to be understood that a greater or less number of sections may be used depending upon the desired capacity of the generator. An advantage and characteristic of utilizing a casing of sectional formation is that access may be readily had to the interior of the casing. In addition the generator may be made to have any desired capacity by merely increasing or decreasing the number of casing sections. As shown in Figures 1 and 8, the casing sections 11, 12 and 13 are provided on the under or bottom portions thereof with integral legs 25. The latter rest on the top wall of the rectangular housing 10 and are anchored in place by means of bolts 26. Access to the interior of the generator casing is provided by way of rectangular openings 27 in the upper front portions of the casing sections. These openings are normally closed by means of doors 28 which fit removably in the openings. The marginal portions of the doors and the portions of the casing sections which define the openings have coacting tapered flanges which when the doors are urged inwardly with respect to the casing seal the casing so that it is air-tight. The doors are held in their closed position by means of screws 29 which extend through and are carried by a bar 30. The latter extends longitudinally of the casing 9 and is removably held in a series of brackets 31 on the casing sections at the sides of the openings 27. The inner ends of the screws are rotatably secured in inwardly extending bosses 32 on the central portions of the doors 28 and the outer ends of the screws have hand wheels 33 whereby the screws may be turned. When the screws are turned in one direction the doors 28 are forced or urged inwardly so as to close and seal the openings 27. When the screws are turned or rotated in the other direction the bar 30 is moved inwardly with respect to the brackets 31 and the doors are thus freed or released from clamping pressure and may be removed from the casing sections to provide access to the casing via the openings 27.

Air under pressure is supplied into the casing for ozone forming purposes by means of three air-supply pipes 34. These pipes are connected to an elongated horizontally extending header 35 and lead respectively to holes 36 in the upper rear portions of the casing sections 11, 12 and 13. The discharge ends of the pipes 34 are connected in any suitable manner to the casing sections so that they register and communicate with the holes 36. Hand valves 37 are associated with the pipes 34 so that the casing sections may be individually controlled as far as the supply of air is concerned. The header 35 is mounted on the upper end of a vertically extending dehydrator 38 and receives air under pressure from a compressor 39 via the dehydrator. The compressor as shown in Figure 1 is disposed in the housing 10 which underlies and supports the generator casing 9. An electric motor 40 is connected to drive the compressor. This motor is disposed in the housing 10 at one side of the compressor and is arranged so that the armature shaft thereof is connected to the rotor of the compressor. A pipe 41 leads from the exhaust side of the compressor to the inlet side of the dehydrator. The air after flowing through the dehydrator wherein all of the moisture in the air is removed flows to the header 35 and then is introduced into the generator casing 9 through the medium of the valve-equipped pipes 34.

The air under pressure within the generator casing 9 is formed into ozone by means of a group of high tension electrodes 42 and a group of grounded electrodes 43. The electrodes 42 are arranged in alternate relation with the electrodes 43 and are spaced from the latter as hereinafter described so that during operation of the generator current passes from one group to the other and transforms the air therebetween into ozone.

The high tension electrodes 42 are divided into three sets there being one set for each section of the casing. As far as construction and mounting are concerned these electrodes are wedge-shaped in cross-section and are supported fixedly and in an angular position in the generator casing 9 by means of a longitudinal series of lower nipples 44 and a longitudinal series of upper nipples 45. The electrodes 42 are preferably in the form of castings and are hollow so that they may be cooled by the circulation of oil therethrough. The nipples 44 and 45 extend through and are connected to a sectional partition 46 which is formed as an integral part of the casing sections 11, 12 and 13 and extends at an angle of approximately 45° across the lower front portion of the casing so as to form therebeneath a segmental space. This space is divided by a pair of oppositely facing U-shaped cross partitions 47 and 48 into a lower oil receiving compartment 49, an intermediate cooling compartment 50 and an upper oil discharging compartment 51. The nipples 44 and 45 hold the high tension electrode 42 so that they extend parallel with the partition 46 and are centrally aligned as far as the upper ends thereof are concerned with the openings 27. The side walls of the electrodes 42 are flat and the electrodes are arranged so that the portions having the least thickness face upwardly and rearwardly and the portions of greatest thickness face downwardly and forwardly. The nipples 44 extend between the oil receiving compartment 49 and the front lower corners of the electrodes 42 and serve to introduce oil from the compartment 49 into the electrodes or circulators therethrough. The coupling nipples 45 extend between the upper front corners of the high tension electrodes 42 and the oil discharging compartment 51 and conduct the oil after circulation through the electrodes to the compartment 51. The nipples 44 and 45 are of sectional construction and include unions 52 for use in connecting the nipple sections together during mounting of the high tension electrodes 42 in place in the casing 9. The sections of the nipples between the unions 52 and the high tension electrodes are formed of glass, porcelain or any non-conducting material in order to insulate the electrodes 42 from the partition 46. Oil for circulation through the electrodes 42 for cooling purposes is introduced into the oil receiving compartment 49 by means of a pipe 53. This pipe is connected to an oil pump (not shown) and leads to the bottom of the compartment 49. A web 54 which is formed integrally with the partition 46 and extends substantially across the compartment 49 operates as a baffle and to cause the oil to flow in a sinuous course from the pipe 53 to the nipples 44. The oil after circulating through the high tension electrodes 42 is discharged from the compartment 51 by means of a pipe 55. The latter leads from the upper portion of the oil discharging compartment 51 to the oil pump which serves to force the oil through the pipe 53 into the oil receiving compartment 49 as hereinbefore described. The pipes 53 and 55 are provided with hand valves 56 whereby the flow of oil through the high tension electrodes 42 may be controlled. A web 57 extends across and forms a baffle for the oil discharging compartment 51 and is formed integrally with and extends downwardly from the partition 46. In order to cool the oil as the latter circulates through the high tension electrodes, water is introduced into and circulated through the intermediate compartment 50. This compartment as shown in Figure 1 is H-shaped and extends the full length of the generator casing 9. Water is introduced into one end of the compartment 50 through a water supply pipe 58 and flows out of the compartment by way of a discharge pipe 59 at the other end of said compartment. Both of these two pipes are valve controlled so that the circulation of water through the compartment 50 for oil cooling purposes may be regulated.

Current is supplied to the high tension, oil cooled electrodes 42 for ozone forming purposes by means of a conductor bar 60 which is positioned on top of the generator casing 9 and extends lengthwise thereof and is supported by means of a plurality of bushings 61 of insulating material. This bar is connected by a conductor 62 to a high voltage transformer (not shown) and supplies current from the transformer to the high tension, oil cooled electrodes 42 by way of three conductors 63. These three conductors are associated respectively with the three sections 11, 12 and 13 of the generator casing 9 and extend through bushings 64 of insulating material so that they lead into the top portion of the casing 9. The bushings as shown in Figure 1 extend through apertures 65 in the upper rear portions of the casing sections and are secured in place by means of rings 66 which overlie the apertures and are bolted in place. The inlet end of each conductor 63, that is the end which is attached to the conductor bar 60, includes a fuse 67 and the discharge end of each conductor is connected by leads 68 to the various high tension oil cooled electrodes in the casing section with which the conductor is associated. By providing a fuse 67 for each conductor 63 the casing sections are individually controlled as far as current supply to the sets of high tension electrodes is concerned. If, for example, one of the high tension electrodes 42 in the casing section 11 should become short-circuited and as a result the fuse 67 for the casing section 11 should break there would be a failure only in the supply of current to the high tension electrodes in the casing section 11 and the generator would continue in operation as far as the production of ozone in casing sections 11 and 13 is concerned. Because of this fuse arrangement there is no likelihood of the entire generator becoming inoperative as the result of one of the high tension electrodes becoming short-circuited.

The grounded electrodes 43 are equal in size to the high tension, oil cooled electrodes 42 and are the same in construction in that they are formed of hollow castings and are wedge-shaped in cross-section. They extend parallel to the electrodes 42 and are arranged in spaced as well as alternate relation with respect to the latter in order to facilitate dismantlement, repair or replacement of the electrodes. The grounded electrodes 43 are arranged in dovetailed relation with the high tension oil cooled electrodes 42, that is, the electrodes 43 are positioned so that the narrowest portions thereof are disposed adjacent to the thickest portions of the electrodes 42 and the portions of greatest thickness are positioned adjacent to the narrowest portions of the high tension electrodes. Because of, this arrangement the electrodes extend rectilinearly as contradistinguished from annularly and have parallel sides with the result that spaces between the two groups of electrodes are of uniform width throughout. The grounded electrodes 43 are divided into three sets similarly to the high tension, oil cooled electrodes 42 and are supported, and supplied with water for cooling purposes, by water supply pipes 69 and water return pipes 70. The pipes 69 are connected to rings 71 and lead downwardly from these rings to the lower rear corners of the grounded electrodes. The rings 71 are mounted on a pipe 72 which extends longitudinally through the rear portion of the generator casing 9. This pipe is supported in, and extends through, bosses 73 and has a longitudinally extending, centrally disposed web 74. This web divides the pipe into a lower duct 75 and an upper duct 76, and as shown in Figure 1, is formed integrally with the pipe. One end of the pipe 72 is closed and the other end is connected to a pair of pipes 77 and 78. The pipe 77 is connected to a water pump (not shown) and supplies water under pressure to the duct 75. The pipe 72 has holes 79 in the bottom portion thereof. These holes are aligned with the inlet ends of the water supply pipes 69 when the electrodes 43 are in the proper position as far as the high tension, oil cooled electrodes 42 are concerned and permit water to flow from the duct 75 to the pipes 69 for supply to the electrodes 43. The water return pipes 70 extend between the upper portions of the rings 71 and the upper rear corners of the grounded electrodes 43. The pipe 72 has holes 80 in the upper portion thereof which register with the outlet ends of the water return pipes 70 when the electrodes 43 are in operating position and permit the water return pipes to discharge into the upper duct 76 in the pipe 72. The pipe 78 is connected to the open end of the duct 76 and serves to conduct from this duct the water that is circulated through the electrodes 43. The rings 71 are rotatably mounted on the pipe 72 and as a result it is possible in connection with repair or replacement of parts in the generator casing to swing the grounded, water cooled electrodes 43 upwardly as shown by dotted lines in Figure 1. The pipes 69, 70 and 72 are formed of metal and hence serve to ground the electrodes 43. To prevent leakage of water from the pipe 72, sealing washers 81 are mounted on the pipe between the rings 71. These washers have side grooves (not shown) with sealing material therein and thus prevent leakage between the rings. The water introduced into the duct 75 for circulation through the grounded electrodes 43 is preferably supplied by pumping it through the pipe 77 at approximately the same pressure as the air introduced into the generator casing for ozone forming purposes via the air supply pipes 34 with the result that the pressure in the casing counterbalances that of the water for cooling the electrodes 43 and hence augments the grooved sealing washers 81 in preventing leakage. The water return pipes 70 are of sectional construction and have unions 82 for connecting the sections together.

The spaces between the high tension, oil cooled electrodes 42 and the grounded, water cooled electrodes 43 are filled with pairs of rectangular dielectric plates 83 which are formed of glass or like dielectric material and are positioned in the generator casing 9 at the same angle as the electrodes 42 and 43. These plates are supported on Y-shaped brackets 85 and blocks 86. The brackets 85, as shown in Figure 1, are connected to and extend upwardly from the lower portions of the casing sections and are arranged to receive the front lower corners of the plates 83. The blocks 86 are mounted on the upper portion of the partition 46 and receive the front upper corners of the dielectric plates. By utilizing the brackets 85 and the blocks 86 as the supporting medium for the dielectric plates, the latter are readily removable and may be withdrawn from the casing upon removal of the doors 28. Associated with each pair of dielectric plates 83 is a rectangular plate 87 of aluminum or like metal which is disposed between and is spaced equidistantly between the two dielectric plates. These plates 87 are in the nature of "floating" electrodes and serve as hereinafter described to increase the ozone forming capacity of the electrodes 42 and 43. The dielectric plates which fit against the sides of the high tension, oil cooled electrodes 42 have sheets 88 of thin aluminum foil on the faces thereof adjacent the electrodes 42 and are provided on their opposite faces with laterally spaced pairs of longitudinally extending, glass side strips 89 and transversely extending, glass top strips 90. These strips serve as spacers for the aluminum plates 87 and form between the plates 87 and the dielectric plates next to the high tension electrodes spaces 91 with open bottoms. These spaces serve as combined air passages and spark gaps wherein ozone is produced or generated during supply of current to the high tension electrodes 42 and the resultant discharge of current to the grounded electrodes. The strips 89 and 90 are cemented in place and the upper ends of the spaces 91 are closed by the glass top strips 90 which extend across the upper ends of the side strips 89. The side strips are preferably arranged so that the outer edges thereof are flush with the side edges of the aluminum plates 87, and the top strips 90 are positioned so that the top edges thereof are flush with the top edges of the aluminum plates. In order to prevent warpage of the plates 87 in the direction of the dielectric plates next to the high tension electrodes, a plurality of pads 92 of insulating material are provided. These pads are located in the spaces 91 and are cemented in place. The dielectric plates which fit against or are next to the grounded, water cooled electrodes 43 have sheets 93 of thin aluminum foil on the faces thereof next to the grounded electrodes and are provided on the opposite faces thereof with laterally spaced longitudinally extending, glass side strips 94 and transversely extending, glass top strips 95. These strips 94 and 95 are arranged similarly to the strips 89 and 90 and serve to space the aluminum plates 87 from the dielectric plates next to the grounded electrodes and to form spaces 96 with open bottoms. These spaces like the spaces 91 serve as combined air passages and spark gaps. Pads 97 of insulating material are located in the spaces 96 and are stuck or cemented to the opposed faces of the aluminum plates 87 and the dielectric plates next to the grounded electrodes. In order to prevent leakage around the strips 89, 90, 94 and 95, layers 98 of plastic cement are applied to the outer edges of the strips as shown in Figure 5. When current is supplied to the high tension oil cooled electrodes 42 it passes in the form of a silent discharge through the dielectric plates 83 and the aluminum plates 87 and across the spaces 91 and 96. As a result of the silent discharge, the air in these spaces is formed into ozone. The ozone which is formed between the dielectric plates 83 flows laterally into a plurality of ring-shaped collectors 99 by way of holes 100 in the upper ends of the aluminum plates 87 and holes 101 in the upper ends of the dielectric plates next to the high tension electrodes. From the collectors 99 the ozone is delivered through pipes 102 to a compartment 103. This compartment as shown in Figure 1 extends longitudinally of the generator casing 9 and is formed directly beneath the upper portion of the partition 46 and above the oil discharging compartment 51. From the compartment 103 the ozone flows via pipe 104 to the point of ozone consumption. The collectors 99 are secured to or formed integrally with the upper ends of the high tension electrodes and have the end faces thereof cemented to the upper ends of the dielectric plates next to the high tension electrodes. The pipes 102 extend through the collectors 99 and lead to the compartment 103. The holes 100 in the upper ends of the aluminum plates 87 permit the ozone which is formed in the spaces 96 to flow from the upper ends of these spaces into the upper ends of the spaces 91. The holes 101 register with the holes in the ring-shaped collectors 99 and permit the ozone to flow from the upper ends of the spaces 91 into the collectors. The collectors 99 are lined with porcelain or like material so as to prevent oxidation as a result to contact with the ozone. The pipes 102 have glass sections 102ᵃ so as to insulate the high tension electrode from the partition 46 in the bottom of the generator casing 9. The walls which define the compartment 103, and the interior of the pipe 104 are lined or coated with the same material as the collectors 99 so as to prevent damage as the result of contact with the ozone. Each pair of dielectric plates 83 and the high tension and grounded electrodes on opposite sides thereof constitutes an ozone generating unit.

When the generator is in operation the air under pressure which is introduced into the generator casing 9 by way of the supply pipes 34 flows upwardly between the dielectric plates 83 into the spaces 91 and 96. As the air passes upwardly in these spaces it is formed into ozone as the result of the silent discharge between the high tension, oil cooled electrodes 42 and the grounded water cooled electrodes 43. The ozone that is formed between the aluminum plates 87 and the dielectric plates next to the grounded electrodes flows through the holes 100 at the upper ends of the aluminum plates 87 into the upper ends of the spaces 91 and it, together with the ozone that is formed in the spaces 91, flows via the holes 101 to the collectors 99. From the collectors the ozone flows through the pipes 102 to the ozone compartment 103 in the generator casing 9. During operation of the generator the high tension electrodes 42 are cooled as the result of the flow of oil therethrough. This oil, as previously pointed out, flows from the pipe 53 into the oil compartment 49 and thence to the lower ends of the electrodes 42 by way of the nipples 44. From the lower ends of the electrodes 43 the oil flows upwardly and then is discharged through the nipples 45 into the oil discharging compartment 51. By virtue of the fact that oil is a nonconductor, the high tension electrodes are not grounded. The oil as it flows through the compartments 49 and 51 is cooled by the water which is circulated through the intermediate compartment 50. During operation of the generator the grounded electrodes 43 are cooled as the result of the circulation of water through them. This water, as heretofore described flows into the lower ends of the grounded electrodes via the supply pipes 69 and then flows out through the return pipes 70. The grounded water cooled electrodes 43 tend to swing downwardly because of their position with respect to the pipe 72 and thus operate to clamp the pairs of dielectric plates 83 between them and the high tension oil, cooled electrodes 42. In the event of breakage of the dielectric plates or it is necessary to replace or repair them, it is only necessary to remove the doors 28 from the openings 27 and then withdraw the dielectric plates through the openings after first releasing them by swinging upwardly the grounded electrodes 43.

The herein described ozone generator is extremely efficient in operation due to the arrangement and construction of the electrodes and because of the aluminum plates 87 which are located between the dielectric plates and serve as "floating" electrodes. It is simple as far as construction is concerned and because of its sectional formation may be built up to any desired capacity.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. An ozone generating unit comprising in combination a high tension electrode, a grounded electrode opposite the high tension electrode, a pair of dielectric plates disposed between the two electrodes and spaced laterally apart, a metallic plate supported between the dielectric plates and forming an insulated floating electrode, insulating means between the dielectric plates and the metallic plate forming on each side of the metallic plate a combined air passage and spark gap having one end open for the introduction of air and its other end closed, means for supplying high voltage current to the high tension electrode for discharge through the dielectric and metallic plates to the grounded electrode to form ozone in the combined air passages and spark gaps, and means for discharging the ozone produced in said combined air passages and spark gaps including a hole in the metallic plate and a hole in one of the dielectric plates adjacent the closed ends of said combined air passages and spark gaps.

2. An ozone generating unit comprising in combination a high tension electrode, a grounded electrode opposite the high tension electrode, a pair of dielectric plates disposed between the two electrodes and spaced laterally apart, strips of insulating material disposed between and cemented to the dielectric plates and arranged to form with the latter a U-shaped, combined air passage and spark gap, means for supplying high voltage current to the high tension electrode for discharge through the plates to the grounded electrode to form ozone in said combined air space and spark gap, and means for discharging laterally the ozone produced in said combined air space and spark gap comprising a hole in one of the plates adjacent to the closed end of the combined air space and spark gap, and a hollow collector member cemented to the outer face of said one plate and communicating with the hole.

3. An ozone generating unit comprising in combination a high tension electrode, a grounded electrode opposite the high tension electrode, a pair of dielectric plates disposed between the two electrodes and spaced laterally apart, a metallic plate supported between the dielectric plates and forming an insulated floating electrode, strips of insulating material between the dielectric plates and the metallic plate forming on each side of said metallic plate a U-shaped combined air passage and spark gap, means for supplying high voltage current to the high tension electrode for discharge through the dielectric and metallic plates to the grounded electrode to form ozone in said U-shaped spaces and means for discharging laterally the ozone produced in said spaces including a hole in the metallic plate adjacent the closed ends of the U-shaped spaces, an opposite hole in the dielectric plate next to the high tension electrode and a hollow collector member mounted on the high tension electrode and cemented to the last mentioned dielectric plate so that it surrounds and communicates with the hole in said plate.

4. An ozone generating unit comprising a pair of laterally spaced dielectric plates forming therebetween a combined air passage and spark gap, a fixedly mounted electrode on one side of the pair of dielectric plates, a wedge-type electrode on the other side of said pair of dielectric plates, a mounting for said last mentioned electrode whereby the latter may be moved bodily in one direction into an operative position wherein the pair of plates are clamped between the two electrodes and moved bodily in the opposite direction into an inoperative position to release the plates for removal purposes, and means for supplying high voltage to one of the electrodes.

5. An ozone generating unit comprising in combination a pair of dielectric plates spaced laterally apart to form therebetween a combined air space and spark gap, an electrode fixedly mounted on one side of the pair of dielectric plates, a wedge-shaped electrode positioned on the opposite side of said pair of plates and pivotally supported so that it may be swung bodily in one direction into an operative position wherein the pair of plates are clamped between the two electrodes and swung bodily in the opposite direction into an inoperative position to release the plates for removal purposes, and means for supplying high voltage current to one of the electrodes.

6. In an ozone generator, the combination of a group of high tension, wedge-shaped electrodes arranged in spaced relation, a group of grounded wedge-shaped electrodes arranged in alternate and dovetailed relation with the high tension electrodes, pairs of laterally spaced dielectric plates disposed between the high tension and grounded electrodes and forming combined air passages and spark gaps, and means for supplying high voltage current to the high tension electrodes.

7. In an ozone generator, the combination of a group of high tension, wedge-shaped electrodes arranged in spaced relation, a group of grounded wedge-shaped electrodes arranged in alternate and dovetailed relation with the high tension electrodes, pairs of laterally spaced dielectric plates disposed between the high tension and grounded electrodes and forming combined air passages and spark gaps, a fixed mounting for one group of electrodes, a movable mounting for the other group of electrodes whereby the latter when shifted in one direction clamp the pairs of dielectric plates between them and the electrodes of said one group, and when they are shifted in the opposite direction release the plates for removal purposes, and means for supplying high voltage current to the high tension electrodes.

8. In an ozone generator, the combination of a group of high tension wedge-shaped electrodes arranged in spaced relation and mounted fixedly in place, a group of grounded wedge-shaped electrodes arranged in alternate and dovetailed relation with the high tension electrodes, pairs of dielectric plates disposed between the high tension and grounded electrodes and forming combined air passages and spark gaps, a pivotal mounting for the grounded electrodes whereby the latter may be individually swung in one direction into an operative position wherein they clamp the pairs of dielectric plates between them and the high tension electrodes and may be individually swung in the other direction to release the pairs of dielectric plates, and means for supplying high voltage current to the high tension electrodes.

JAMES MARLOWE DAILY.